United States Patent [19]

Asai et al.

[11] Patent Number: 5,260,681

[45] Date of Patent: Nov. 9, 1993

[54] PAGING RECEIVER WITH RESONANT BOX

[75] Inventors: Takayuki Asai, Tokyo; Kuniaki Koga, Shizuoka, both of Japan

[73] Assignee: NEC Corporation, Japan

[21] Appl. No.: 795,923

[22] Filed: Nov. 20, 1991

[30] Foreign Application Priority Data

Nov. 20, 1990 [JP] Japan ................... 2-316805

[51] Int. Cl.⁵ .............................................. G08B 3/00
[52] U.S. Cl. .................................. 340/388; 340/393; 340/394; 340/311.1
[58] Field of Search ........... 340/388, 393, 394, 311.1, 340/407

[56] References Cited

U.S. PATENT DOCUMENTS

| | | | |
|---|---|---|---|
| 4,142,186 | 2/1979 | Sweany et al. | 340/388 |
| 4,183,017 | 1/1980 | Sims | 340/388 |
| 4,409,588 | 10/1983 | Hofer et al. | 340/388 |
| 4,700,177 | 10/1987 | Nakashima et al. | 340/388 |

*Primary Examiner*—Donnie L. Crosland
*Attorney, Agent, or Firm*—Ostrolenk, Faber, Gerb & Soffen

[57] ABSTRACT

A paging receiver provided with a speaker unit including a first resonant box and a second resonant box in order to produce a higher sound pressure without however enlarging a casing of the receiver body is disclosed. The second resonant box is formed made in a hollow space of a mold for fixing a holder to the casing of the paging receiver and is provided with slits to resonate in response to the sound wave outputted from the first resonant box at either input or output portion of the sound wave.

7 Claims, 4 Drawing Sheets

PAGING RECEIVER WITH RESONANT BOX

BACKGROUND OF THE INVENTION

The present invention generally relates to a paging receiver and, particularly, to an improvement in an alert signal generating section formed with a resonant box in a casing of the receiver body.

In the conventional paging receiver as shown in FIG. 4, an alert signal generate section 201 is constructed to generate a sound wave or an alert signal by means of a speaker 103 placed on a printed circuit board 101 and to resonate the sound wave thus generated at a resonant space 104 within a casing 102 of a paging receiver body. The resonated wave as outputted from slits 111.

Since the conventional paging receiver uses the space 104 within the casing of the receiver body as a resonant box for alert sound, the receiver has the following disadvantages. Namely, since the receiver body is required to be made compact the space is not sufficiently for the resonant box with the lowered sound pressure. Further, the larger casing of the receiver body is required to secure a higher sound pressure.

SUMMARY OF THE INVENTION

An object of the present invention is to solve the disadvantages as described above and to provide a paging receiver capable of producing higher sound pressure upon carrying the receiver without however enlarging the casing of the receiver body.

In the paging receiver in accordance with the present invention, provision is made of a speaker unit including a vibrator for outputting a sound wave by converting electric signals from a printed circuit board and a first resonant box which resonates in response to the outputted sound wave, wherein provision is made of a second resonant box arranged to resonate in response to the sound wave outputted from the first resonant box and releasably mounted on the casing of the receiver body.

In the paging receiver, the resonant box may have a wider resonant space than that of the first resonant box.

The paging receiver according to the invention may be provided with a holder to be conveniently attached to the speaker unit upon carrying and the holder is formed integrally with the second resonant box.

The holder may further be comprised of a mold for fixing the casing of the paging receiver, a screw for mechanically coupling the receiver body with the holder, a clip for mounting the receiver on the belt or the like for the human body and a second resonant box.

The second resonant box may be formed of a hollow space made in the mold. Moreover, the second resonant box is preferably provided with slits at either input or output portion of the sound wave.

In the paging receiver according to the invention, the second resonant box is releasably mounted to the speaker unit and the sound wave outputted from the first resonant box is resonated at the second resonant box. The second resonant box preferably has a wider resonance space than that of the first resonant box and the receiver is further provided with the holder mounted on the speaker unit for convenience on carry of the receiver, while the holder being integrally formed with the second resonant box to provide an unitary structure which may produce a higher sound pressure with a compact casing of the receiver body.

BRIEF DESCRIPTION OF THE DRAWINGS

Embodiments of the paging receiver in accordance with the present invention will be described in detail with reference to the accompanying drawings in which.

PREFERRED EMBODIMENTS OF THE INVENTION

Figure 1:
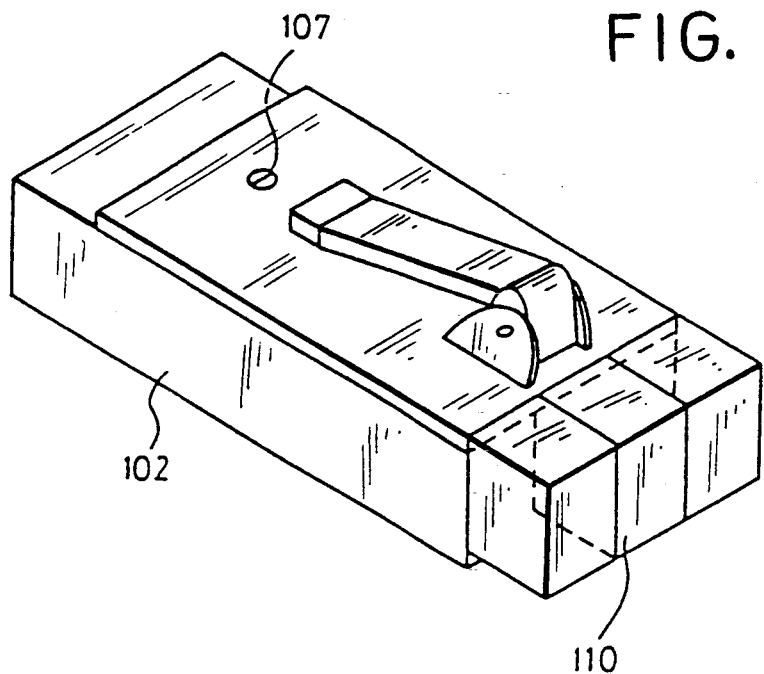
FIG. 1 is a perspective view showing one embodiment of the paging receiver according to the invention.
Figure 2:
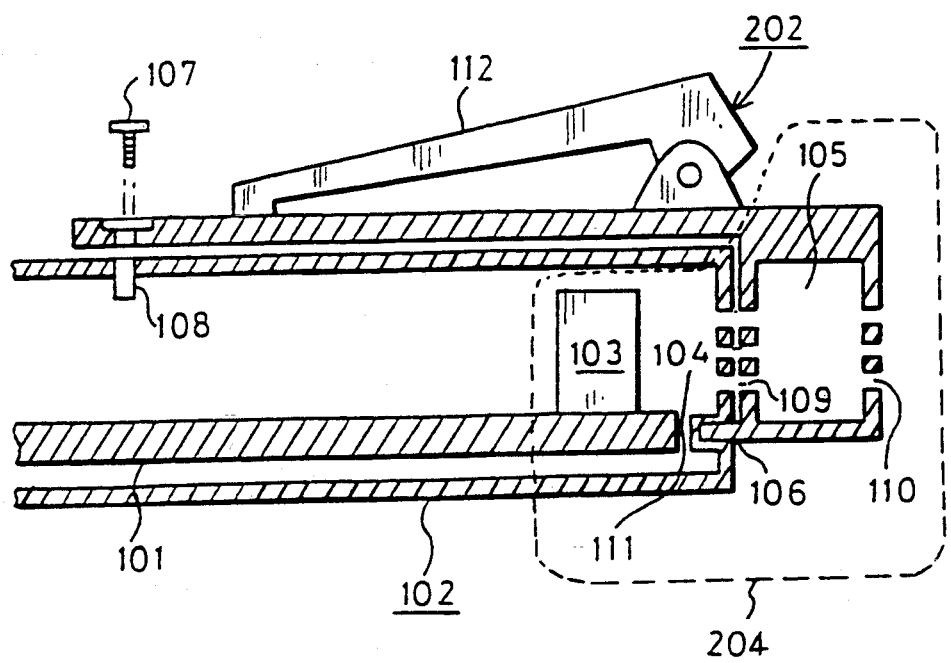
FIG. 2 is a fragmentarily sectioned view of a paging receiver showing the essential arrangement according to the invention wherein a receiver holder is mounted on the receiver body.
Figure 3:
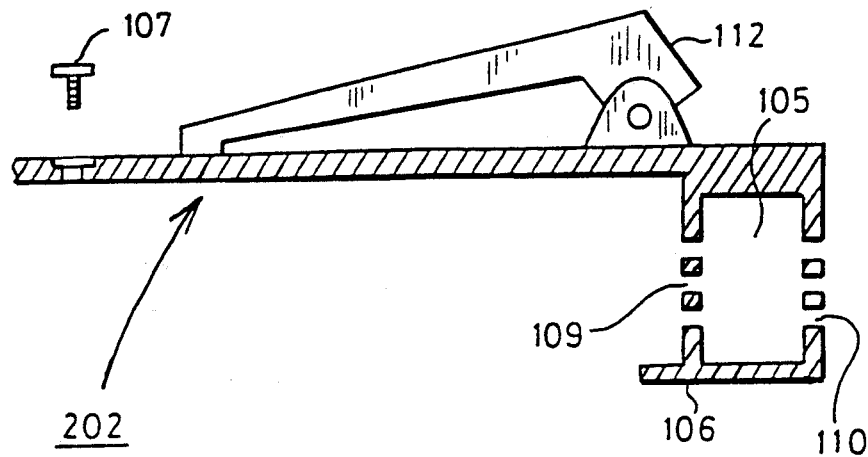
FIG. 3 is a sectional view of the holder as shown in FIG. 1.
Figure 4:
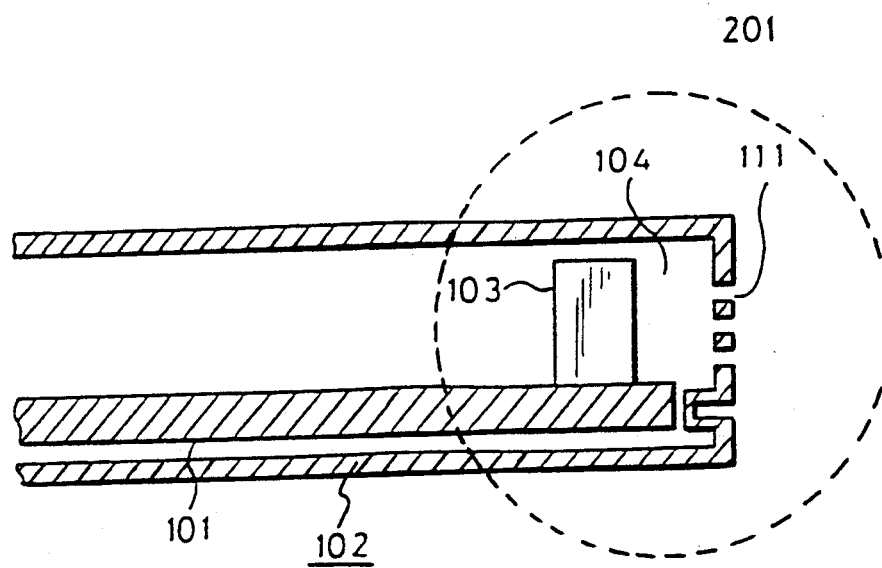
FIG. 4 is a fragmentarily sectioned view of an alert generating section of the conventional paging receiver.

In FIGS. 1 to 3, the paging receiver according to the present invention comprises in a casing 102 thereof an alert signal generating section 204 having a speaker 103 which is mounted on a printed circuit board 101 and outputs a sound wave or an alert signal. The receiver also comprises a first resonant box, or space 104, which resonates in response to the outputted sound wave.

The receiver further comprises a second resonant box 105 which resonates in response to the sound wave outputted from the first resonant box 104 and is releasably mounted on the casing 102 of the receiver body. The resonated sound wave is delivered from the resonant box 105 through slits 110.

As can be seen from the above description the sound wave is resonant in the first resonant box 104 formed of the space within the casing 102 of the receiver body and is then outputted. The sound wave outputted from the first resonant box 104 is propagated into the second resonant box 105 formed in the holder 202 through in turn the slits 111 provided on the first resonant box 104 and slits 109 provided on the holder 202 and the sound pressure is amplified by resonance. The sound wave of the amplified sound pressure is thus outputted externally through the slits 110.

In this embodiment, the alert signal generating section 204 is releasably mounted with a holder 202 for convenience in carry of the receiver and the holder 202 is integrally formed with the second resonant box 105. The second resonant box 105 may be formed of a space wider than that of the first resonant box 104.

The holder 202 is provided with a pawl 106 and a screw 107 for mounting on a part of the casing 102, so that the holder 202 may be conveniently attached to the receiver body by engaging the pawl 106 with the predetermined portion of the casing and tightening the screw 107 into a female screw 108 provided in a part of the casing 102.

Figure 5:
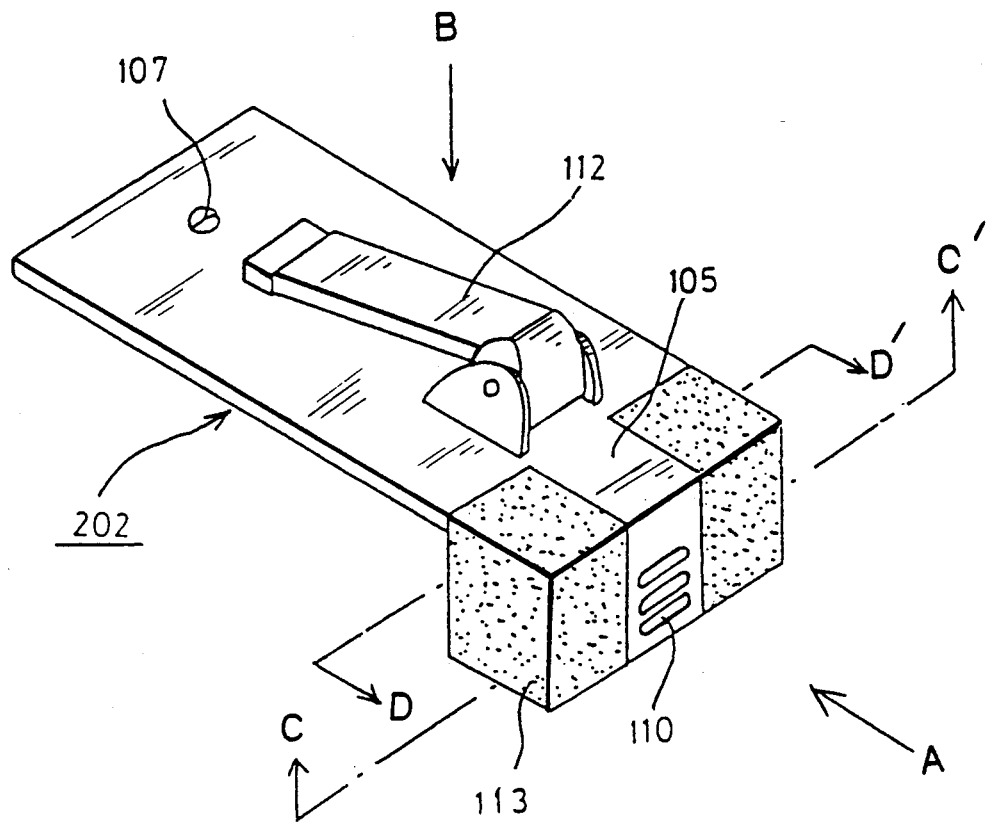
FIG. 5 is a perspective view of the holder as shown in FIG. 1.
Figure 6:
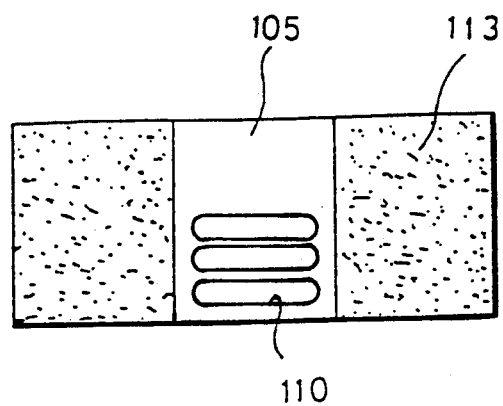
FIG. 6 is an end view of the holder viewed along an arrow mark A in FIG. 5.
Figure 7:
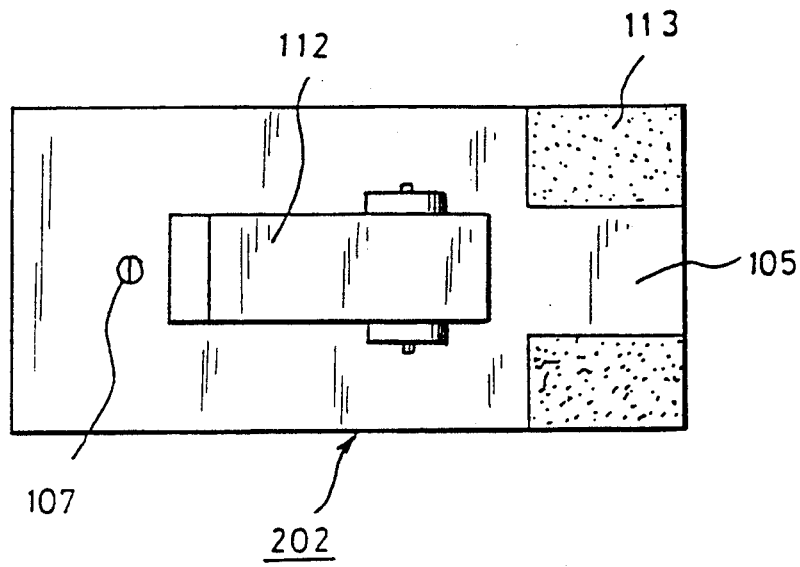
FIG. 7 is a plan view of the holder viewed along an arrow mark B in FIG. 5.

In FIG. 5, the holder 202 is comprised of a mold 113 for securing to the casing 102 of the receiver body as shown in FIG. 1, a screw 107 for mechanically coupling the casing with the holder 202, a clip 112 for mounting the receiver on user's belt or the like and a second resonant box 105.

Figure 8:
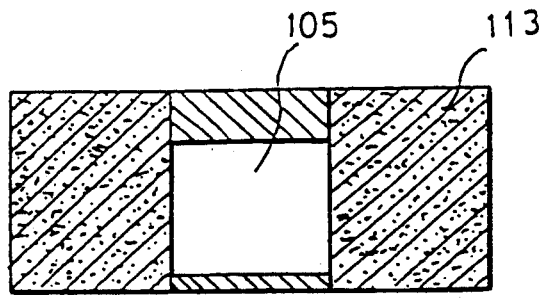
FIG. 8 is a sectional view taken along the line C—C' of FIG. 5.
Figure 9:
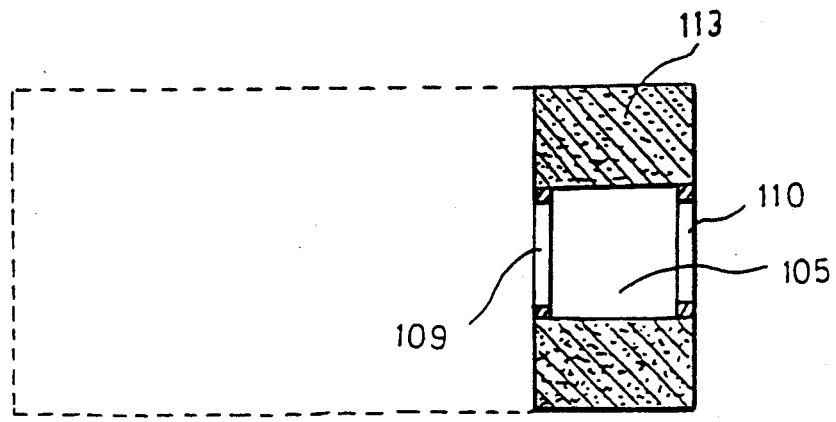
FIG. 9 is a sectional view taken along the line D—D' of FIG. 5.

As shown in FIGS. 8 and 9, the hollow space 105 of the mold 113 is made for the second resonant box.

As hereinbefore fully described, in accordance with the paging receiver of the invention, a larger space enough to be used as the resonant box may be secured to produce the higher sound pressure on carry without enlarging the casing of the receiver body.

What is claimed is:

1. Paging receiver apparatus including:
   a receiver subassembly, a holder subassembly, and means mechanically securing said subassemblies together in operative relationship;
   said receiver subassembly including a body, sound generating means on said body, first resonating means formed in said body for resonating in response to sound generated by said sound generating means, and first grill means defining first aperture means through which sound is emitted from said resonating means;
   said holder subassembly including second resonating means comprising a sound resonating box means for resonating in response to sound emitted from said first resonating means;
   said box means being partially bounded by second grill means which defines second aperture means that corresponds with said first aperture means and is aligned therewith whereby sound emitted through said first aperture means enters said box means through said second aperture means.

2. A paging receiver apparatus as claimed in claim 1, wherein said second resonant means comprises a wider resonant space than that of the first resonant means.

3. A paging receiver apparatus as claimed in claim 1, wherein said second resonating means is conveniently attached to said receiver body upon carrying the receiver.

4. A paging receiver apparatus as claimed in claim 1, wherein said holder subassembly comprises a clip for mounting said apparatus on a user's belt or the like, in an operative position wherein said second resonant means is above said body.

5. A paging receiver apparatus as claimed in claim 4, wherein said holder assembly includes a molded part and said second resonant means comprises a hollow space formed in said molded part.

6. A paging receiver apparatus as claimed in claim 5, wherein said box means is provided with third aperture means disposed opposite said second aperture means and through which sound is emitted from said box means.

7. A paging receiver apparatus as claimed in claim 6, wherein said molded part includes a holding formation in operative engagement with a cooperating formation on said body.

* * * * *